(12) United States Patent
Kawaguchi (10) Patent No.: US 9,542,574 B2
(45) Date of Patent: Jan. 10, 2017

(54) PROGRAMMABLE LOGIC CONTROLLER

(75) Inventor: Mami Kawaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/405,688

(22) PCT Filed: Jul. 26, 2012

(86) PCT No.: PCT/JP2012/069006
§ 371 (c)(1),
(2), (4) Date: Dec. 4, 2014

(87) PCT Pub. No.: WO2014/016938
PCT Pub. Date: Jan. 30, 2014

(65) Prior Publication Data
US 2015/0169903 A1   Jun. 18, 2015

(51) Int. Cl.
*G06F 21/71* (2013.01)
*G06F 21/31* (2013.01)
(Continued)

(52) U.S. Cl.
CPC ............... *G06F 21/71* (2013.01); *G06F 21/31* (2013.01); *G06F 21/602* (2013.01); *G06F 21/78* (2013.01);
(Continued)

(58) Field of Classification Search
CPC .......... G06F 21/20; G06F 21/22; G06F 21/24; G06F 21/62; G06F 21/71; G06F 21/31; G06F 21/602; G06F 21/6218; G06F 21/78
(Continued)

(56) References Cited

U.S. PATENT DOCUMENTS 7,118,024 B1    10/2006 Hoshino
7,596,570 B1 *   9/2009 Emigh ................ G06F 11/1453
(Continued)

FOREIGN PATENT DOCUMENTS

CN    1277400 A    12/2000
JP    6-110512 A    4/1994
(Continued)

OTHER PUBLICATIONS

JPO Office Action for Application No. 2013-516043 dated Jun. 4, 2013.
(Continued)

*Primary Examiner* — Carl Colin
*Assistant Examiner* — Gary Lavelle
(74) *Attorney, Agent, or Firm* — Sughrue Mion, PLLC; Richard C. Turner (57) ABSTRACT

A programmable logic controller includes a device that stores therein data, an authentication-information storage unit that stores therein authentication information, an authentication function unit that performs a user authentication based on the authentication information, and an encryption filter that has a plurality of encryption patterns. When writing of data to the device is requested, the authentication function unit performs the user authentication. When the user authentication is successful, the encryption filter performs the encryption processing to the data with the encryption pattern set in advance by the user to write the data to the device, and when the user authentication fails, the encryption filter performs the encryption processing to the data with one of the encryption patterns that is different from the encryption pattern set in advance by the user to write the data to the device.

4 Claims, 5 Drawing Sheets (51) Int. Cl.
*G06F 21/78* (2013.01)
*G06F 21/62* (2013.01)
*G06F 21/30* (2013.01)
*G06F 21/60* (2013.01)
*G06F 21/32* (2013.01)

(52) U.S. Cl.
CPC ............... *G06F 21/30* (2013.01); *G06F 21/32* (2013.01); *G06F 21/606* (2013.01); *G06F 21/62* (2013.01)

(58) Field of Classification Search
USPC .......................................................... 713/189
See application file for complete search history.

(56) References Cited

U.S. PATENT DOCUMENTS

| | | | |
|---|---|---|---|
| 7,853,787 | B2 | 12/2010 | Hasegawa |
| 2002/0091975 | A1* | 7/2002 | Redlich et al. ............... 714/699 |
| 2006/0106803 | A1 | 5/2006 | Takeuchi et al. |
| 2006/0215839 | A1* | 9/2006 | Augenstein ......... G06F 21/6218 380/277 |
| 2007/0133280 | A1 | 6/2007 | Oshiba et al. |
| 2007/0256142 | A1* | 11/2007 | Hartung et al. ................ 726/28 |
| 2010/0175116 | A1* | 7/2010 | Gum ................................ 726/6 |
| 2010/0275005 | A1* | 10/2010 | Barfield et al. ............... 713/150 |

FOREIGN PATENT DOCUMENTS

| | | |
|---|---|---|
| JP | 10-207777 A | 8/1998 |
| JP | 2004-213346 A | 7/2004 |
| JP | 2006-157883 A | 6/2006 |
| JP | 2008-66935 A | 3/2008 |
| JP | 2010-4126 A | 1/2010 |
| JP | 2010-250405 A | 11/2010 |
| TW | 201128334 A | 8/2011 |
| WO | 2006/040798 A1 | 4/2006 |
| WO | 2006/075355 A1 | 7/2006 |

OTHER PUBLICATIONS

Shigeru Matsumoto, "Suggestion for near-future LNC -What is expected for PLC (12) (final)", Instrumentation Control Engineering, Feb. 1, 2012, pp. 2 and 3, vol. 55, No. 2.
TW Office Action for Application No. 102107452 dated Aug. 19, 2014.
International Search Report for PCT/JP2012/069006 dated Oct. 2, 2012 [PCT/ISA/210].
Communication dated Jan. 7, 2015, issued by the German Patent Office in counterpart Application No. 112012006329.5.
Hard disk encryption, Wikipedia, accessed Feb. 17, 2015.
Communication dated Nov. 27, 2015 issued by the Korean Intellectual Property Office in counterpart application No. 1020147034637.
Communication dated Sep. 2, 2016 from the State Intellectual Property Office of the P.R.C. in counterpart application No. 201280074591.6.

* cited by examiner

PROGRAMMABLE LOGIC CONTROLLER

CROSS REFERENCE TO RELATED APPLICATIONS

This application is a National Stage of International Application No. PCT/JP2012/069006, filed on Jul. 26, 2012, the contents of all of which are incorporated herein by reference in their entirety.

FIELD

The present invention relates to a programmable logic controller.

BACKGROUND

A device of a programmable logic controller is a memory that is provided in the programmable logic controller to store therein data of information primarily related to manufacturing, such as control information of a machine tool and a manufacturing apparatus and recipe information including the temperature or mixing ratio of materials in an apparatus.

A user can freely perform writing and reading of data to/from the device using a computer in which a programming tool or a monitoring tool of the programmable logic controller is installed or using other external input/output devices compatible with the programmable logic controller. The writing and reading can be similarly performed via a network by use of an information system unit or the like.

Reading and writing of data can be also performed from/to the device of the programmable logic controller by a program that runs on the programmable logic controller using a device read command or a device write command, apart from the tools mentioned above.

A control method of a manufacturing apparatus using a programmable logic controller and a manufacturing method of products using the manufacturing apparatus are generally recorded in a device. Such information is know-how of each of manufacturers of manufacturing apparatuses and is often information classified as secrets by the manufacturers of the manufacturing apparatuses.

Meanwhile, as for the device, anyone can freely access any device through the tool or the program. In addition, data recorded in the device may be changed by an erroneous operation.

Patent Literature 1 discloses a programmable logic controller peripheral device, including an encryption unit that encrypts authentication data for authenticating whether to permit a communication to the programmable logic controller with respect to data used in the programmable logic controller.

CITATION LIST

Patent Literature

Patent Literature 1: International Publication No. WO2006/075355

SUMMARY

Technical Problem

However, in the conventional technique, while confidentiality of information is enhanced by performing encryption processing to authentication data, data to be used in the programmable logic controller is not subjected to encryption processing. Accordingly, a demand for an enhancement in confidentiality of the data itself to be used in the programmable logic controller has been increased.

Furthermore, in the conventional technique, while the peripheral device as a unit different from the programmable logic controller has an encryption processing function, it is desirable that confidentiality of data recorded in the device can be enhanced by the programmable logic controller alone to reduce the space occupied by the entire system.

The present invention has been achieved in view of the above aspects, and an object of the present invention is to provide a programmable logic control that can restrict an access to a device.

Solution to Problem

The present invention is directed to a programmable logic controller that achieves the object. The programmable logic controller includes a device that stores therein data; an authentication-information storage unit that stores therein authentication information; an authentication function unit that performs a user authentication based on the authentication information stored in the authentication-information storage unit; and an encryption filter that has a plurality of encryption patterns, any one of the encryption patterns being set in advance by a user for encryption processing.

When writing of data to the device is requested by an external device, the authentication function unit performs the user authentication, causes, when the user authentication is successful, the encryption filter to perform the encryption processing to the data to be written to the device with the encryption pattern set in advance by the user so as to write the data to the device, and causes, when the user authentication fails, the encryption filter to perform the encryption processing to the data to be written to the device with one of the encryption patterns that is different from the encryption pattern set in advance by the user so as to write the data to the device.

Advantageous Effects of Invention

The programmable logic controller according to the present invention can restrict persons who can access a device and can prevent information from being rewritten by an erroneous operation.

DESCRIPTION OF EMBODIMENTS

Exemplary embodiments of a programmable logic controller according to the present invention will be explained below in detail with reference to the accompanying drawings. The present invention is not limited to the embodiments.

Embodiment

Figure 1:
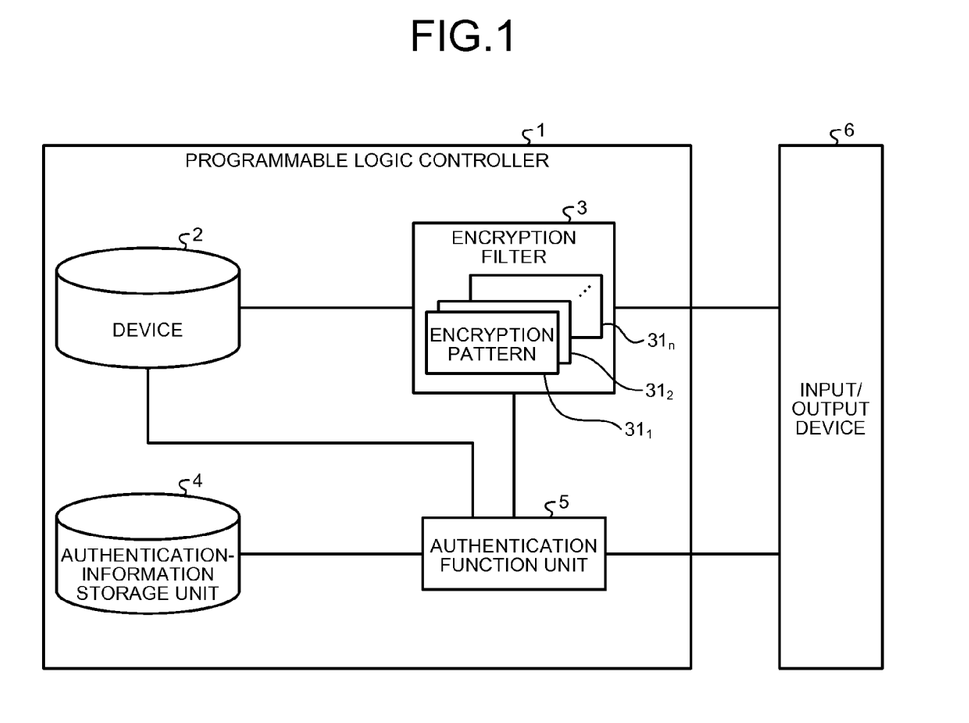
FIG. 1 shows a configuration of a programmable logic controller according to an embodiment of the present invention.

FIG. 1 shows a configuration of a programmable logic controller according to an embodiment of the present invention. A programmable logic controller 1 includes an authentication function unit 5, an authentication-information storage unit 4, an encryption filter 3, and a device 2.

The authentication function unit 5 performs authentication processing based on a user name and a password. The user name and the password are registered in advance in the authentication-information storage unit 4. When the device 2 is accessed, a user name and a password input by a user are compared with the user name and the password registered in the authentication-information storage unit 4. The authentication function unit 5 determines an authentication success when data of the user names and the passwords matches with each other as a result of the comparison, and determines an authentication failure when the data does not match with each other. When it is determined as an authentication failure at the time of reading data from the device 2, the encryption filter 3 encrypts data with an encryption pattern that is different from one of encryption patterns $31_1$ to $31_n$, which is set in advance by the user, and the encrypted data is output to an input/output device (external device) 6.

The encryption filter 3 is installed between the input/output device 6 and the device 2. The encryption filter 3 has a plurality of encryption patterns 31 ($31_1$ to $31_n$). Before an access to the device 2, the user arbitrarily sets as to whether which one of the encryption patterns $31_1$ to $31_n$ is used for the encryption processing. The encryption patterns $31_1$ to $31_n$ are keys required for encryptions and can be set or changed at an arbitrary timing. The encryption filter 3 monitors contents to be read from or written to the device 2 and checks a range of the device 2 as an input/output target, that is, a range of reading data from the device 2 or a range of writing data to the device 2. When the check result is within an encryption target range (in other words, when it is reading or writing of data from/to the device 2 selected in advance), an encryption is performed. The reading or writing data from/to the device 2 is performed by dividing the device into a plurality of meaningful blocks. An access range in each of the blocks can be further specified. When an encryption is performed at the time of writing data to the device 2, a value to be written to the device 2 is encrypted. When an encryption is performed at the time of reading from the device 2, a read value from the device 2 to be output to the input/output device 6 is encrypted.

Figure 2:
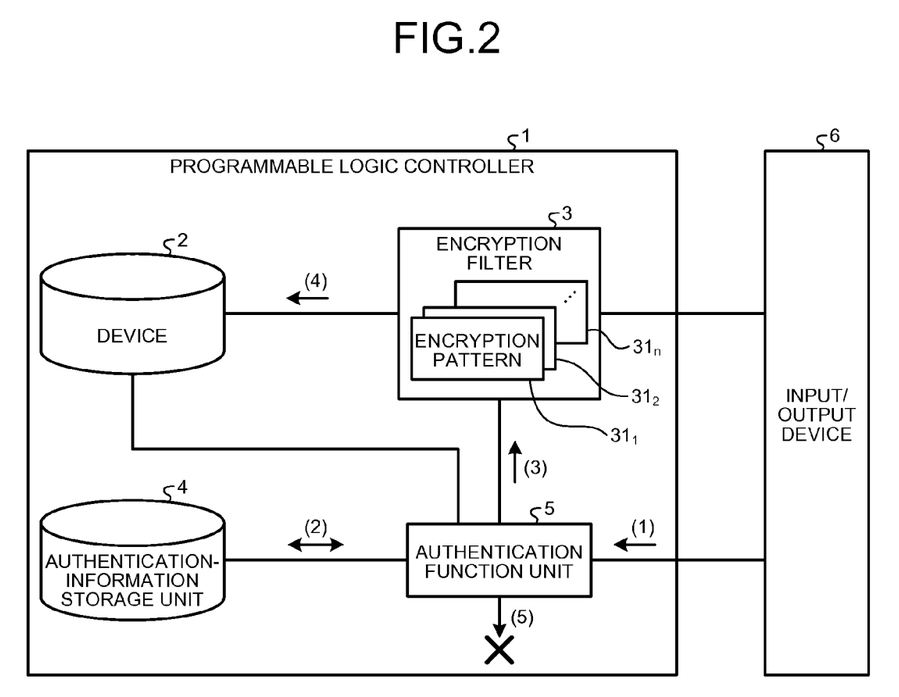
FIG. 2 shows a data write operation in a case of setting where an encryption is performed at the time of writing data to a device.

FIG. 2 shows a data write operation in a case of setting where an encryption is performed at the time of writing data to a device. At the time of writing data to the device 2, a user first inputs a device number and data of a write destination, a user name, and a password to the programmable logic controller 1 via the input/output device 6 (FIG. 2(1)). The authentication function unit 5 compares the user name and the password input to the programmable logic controller 1 with the user name and the password registered in advance in the authentication-information storage unit 4 (FIG. 2(2)). When a comparison result indicates a match and the authentication function unit 5 determines an authentication success, the device number and the data of the write destination are transmitted to the encryption filter 3, and data input from the input/output device 6 is encrypted with one of the encryption patterns $31_1$ to $31_n$, which is specified in advance by setting (FIG. 2(3)). The data encrypted by the encryption filter 3 is written to the device 2 based on the device number of the write destination (FIG. 2(4)). When the authentication function unit 5 determines an authentication failure, the authentication function unit 5 discards the data input from the input/output device 6 (FIG. 2(5)). Therefore, the writing of the data to the device 2 is not performed. The discard of data is expressed by "x" in FIG. 2.

Figure 3:
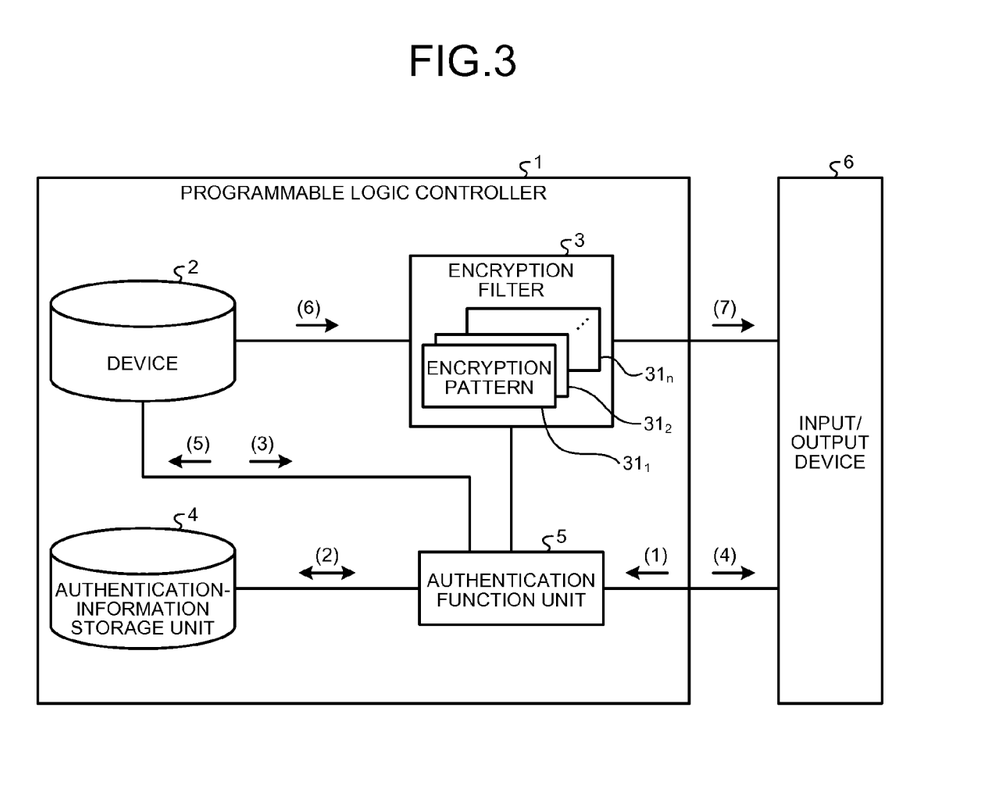
FIG. 3 shows a data read operation in a case of setting where an encryption is performed at the time of writing data to a device.

FIG. 3 shows a data read operation in a case of setting where an encryption is performed at the time of writing data to a device. A user first inputs a device number and data of a read source, a user name, and a password to the programmable logic controller 1 via the input/output device 6 (FIG. 3(1)). The authentication function unit 5 compares the user name and the password input to the programmable logic controller 1 with the user name and the password registered in advance in the authentication-information storage unit 4 (FIG. 3(2)). When a comparison result indicates a match and the authentication function unit 5 determines an authentication success, the authentication function unit 5 reads data specified by the user from the device 2 based on the device number of the read source (FIG. 3(3)). The authentication function unit 5 outputs the data read from the device 2 to the input/output device 6 (FIG. 3(4)). When the authentication function unit 5 determines an authentication failure, the authentication function unit 5 transmits a command to the device 2 to output data corresponding to the device number of the read source to the encryption filter 3 (FIG. 3(5)). The data read from the device 2 is transferred to the encryption filter 3 (FIG. 3(6)), is further encrypted with one of the encryption patterns $31_1$ to $31_n$, which is different from that set by the user for writing data, and is then output to the input/output device 6 (FIG. 3(7)).

Figure 4:
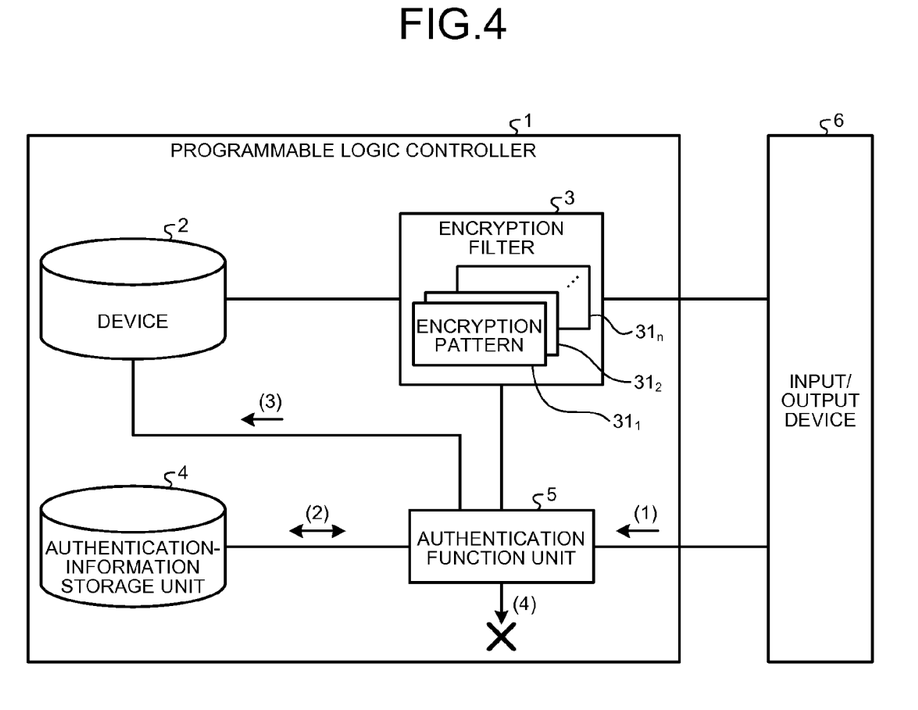
FIG. 4 shows a data write operation in a case of setting where an encryption is performed at the time of reading data from a device.

FIG. 4 shows a data write operation in a case of setting where an encryption is performed at the time of reading data from a device. When data is written to the device 2, a user first inputs a device number and data of a write destination, a user name, and a password to the programmable logic controller 1 via the input/output device 6 (FIG. 4(1)). The authentication function unit 5 compares the user name and the password input to the programmable logic controller 1 with the user name and the password registered in advance in the authentication-information storage unit 4 (FIG. 4(2)). When a comparison result indicates a match and the authentication function unit 5 determines an authentication success, the authentication function unit 5 writes data input from the input/output device 6 to the device 2 based on the device number of the write destination (FIG. 4(3)). When the authentication function unit 5 determines an authentication failure, the authentication function unit 5 discards the data input from the input/output device 6 (FIG. 4(4)). Therefore, the writing of the data to the device 2 is not performed. Discard of the data is expressed by "x" in FIG. 4.

Figure 5:
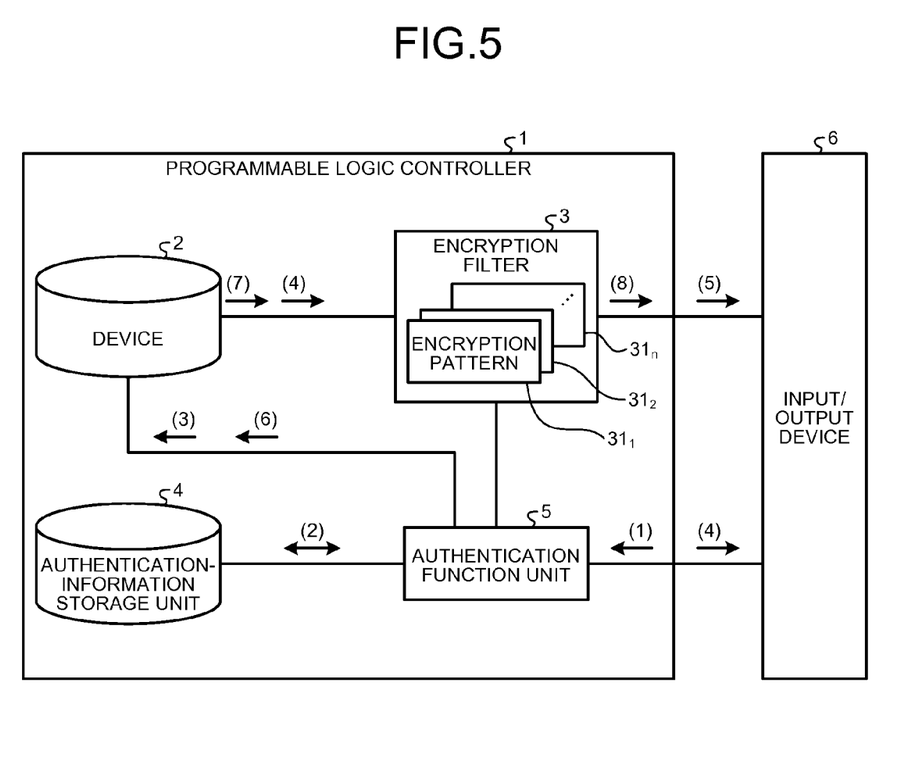
FIG. 5 shows a data read operation in a case of setting where an encryption is performed at the time of reading data from a device.

FIG. 5 shows a data read operation in a case of setting where an encryption is performed at the time of reading data from a device. A user first inputs a device number and data of a read source, a user name, and a password to the programmable logic controller 1 via the input/output device 6 (FIG. 5(1)). The authentication function unit 5 compares the user name and the password input to the programmable logic controller 1 with the user name and the password registered in advance in the authentication-information storage unit 4 (FIG. 5(2)). When a comparison result indicates a match and the authentication function unit 5 determines an authentication success, the authentication function unit 5 transmits a command to the device 2 to output data corresponding to the device number of the read source to the encryption filter 3 (FIG. 5(3)). The data read from the device 2 is transferred to the encryption filter 3 (FIG. 5(4)), is encrypted with one of the encryption patterns $31_1$ to $31_n$, which is set by the user for writing data, and is then output to the input/output device 6 (FIG. 5(5)). When the authentication function unit 5 determines an authentication failure, the authentication function unit 5 transmits a command to the device 2 to output the data corresponding to the device number of the read source to the encryption filter 3 (FIG. 5(6)). The data read from the device 2 is transferred to the encryption filter 3 (FIG. 5(7)), is encrypted with one of the encryption patterns $31_1$ to $31_n$, which is different from that set by the user for writing data, and is then output to the input/output device 6 (FIG. 5(8)).

As described above, when a user authentication fails, data is output to an input/output device after being encrypted with an encryption pattern that is different from that set for writing data by the user. Therefore, unauthorized reading of data from a device by a person having no authority therefor can be prevented. Furthermore, because data output from the programmable logic controller to the input/output device is in an encrypted state regardless of whether an authorization is successful, confidentiality of data that the user does not wish to disclose is high. That is, even if a password is stolen, decryption (decoding) of device information is difficult without an encryption key and thus a leak of the information can be prevented. To provide supplement explanations, because an encryption is performed with an encryption pattern also when a user authentication fails, acquisition of correct data is difficult even if an encryption pattern of the time of an unauthorized access is deciphered. Further, an input value and an output value are different from each other and thus, even if the input value or the output value is stolen, deciphering with the same encryption pattern is difficult.

Because a security function can be provided only with the programmable logic control, the system can be downscaled.

While a user authentication using a user name and a password has been explained as an example in the embodiment described above, a biometrics authentication using biometric information such as a fingerprint, a voiceprint, or an iris can be alternatively performed. When a user authentication is performed using the biometric information, the risk of a password theft is eliminated and the confidentiality of data can be further enhanced.

INDUSTRIAL APPLICABILITY

As described above, the programmable logic controller according to the present invention is useful in enhancing confidentiality of information to be stored in a device and is particularly suitable for applications of controlling a machine tool or a manufacturing device.

REFERENCE SIGNS LIST

1 programmable logic controller, 2 device, 3 encryption filter, 4 authentication-information storage unit, 5 authentication function unit, 6 input/output device, $31_1$ to $31_n$ encryption pattern.

The invention claimed is:

1. A programmable logic controller that executes a sequence program and controls a control target device, the programmable logic controller comprising:
   a device that stores therein data related to an operation of the control target device and used when the control target device is controlled;
   an authentication-information storage unit that stores therein authentication information;
   an authentication function unit that performs a user authentication based on the authentication information stored in the authentication-information storage unit; and
   an encryption filter that has a plurality of encryption patterns, one of the encryption patterns being set in advance by a user for encryption processing,
   wherein when writing of the data to the device is requested by an external device, the authentication function unit performs the user authentication,
      causes, when the user authentication is successful, the encryption filter to perform the encryption processing on the data to be written to the device with the encryption pattern set in advance by the user to write the encrypted data to the device, and
      discards, when the user authentication fails, the data for which writing to the device is requested, and
   wherein when reading of data from the device is requested by the external device, the authentication function unit performs the user authentication,
      outputs, when the user authentication is successful, the data read from the device to the external device, and
      controls, when the user authentication fails, the encryption filter to perform the encryption processing on the data read from the device with one of the encryption patterns that is different from the encryption pattern set in advance by the user and is not set for the encryption processing in association with the user and to output the encrypted data to the external device.

2. The programmable logic controller according to claim 1, wherein the programmable logic controller determines that the encryption processing is to be performed when the data is requested to be read from or written to the device in an encryption target range of the device selected in advance.

3. A programmable logic controller that controls a control target device, comprising:
   a device that stores therein data;
   an authentication-information storage unit that stores therein authentication information;
   an authentication function unit that performs a user authentication based on the authentication information stored in the authentication-information storage unit; and
   an encryption filter that has a plurality of encryption patterns, one of the encryption patterns being set in advance by a user for encryption processing,
   wherein when writing of data to the device is requested by an external device, the authentication function unit performs the user authentication,
      writes, when the user authentication is successful, the data to the device, and
      discards, when the user authentication fails, the data for which writing to the device is requested, and
   wherein when reading of data from the device is requested by the external device, the authentication function unit performs the user authentication,
      controls, when the user authentication is successful, the encryption filter to perform the encryption processing to the data read from the device with the encryption pattern set in advance by the user to as to output the encrypted data to the external device, and
      controls, when the user authentication fails, the encryption filter to perform the encryption processing on the data read from the device with one of the encryption patterns that is different from the encryption pattern set in advance by the user and is not set for the encryption processing in association with the user and to output the encrypted data to the external device.

4. The programmable logic controller according to claim 3, wherein the programmable logic controller determines that the encryption processing is to be performed when the data is requested to be read from or written to the device in an encryption target range of the device selected in advance.

* * * * *